US008888106B2

(12) United States Patent
Hamade et al.

(10) Patent No.: US 8,888,106 B2
(45) Date of Patent: Nov. 18, 2014

(54) SEAL PLATE, SEAL MEMBER THAT IS USED IN SEAL PLATE, AND METHOD FOR MANUFACTURING THE SAME

(75) Inventors: Masato Hamade, Machida (JP); Tsutomu Yoshida, Gojo (JP); Nobuhiro Yoshida, Gojo (JP); Kazuaki Tsuji, Machida (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 660 days.

(21) Appl. No.: 13/119,473

(22) PCT Filed: Sep. 15, 2009

(86) PCT No.: PCT/JP2009/066084
§ 371 (c)(1),
(2), (4) Date: Mar. 17, 2011

(87) PCT Pub. No.: WO2010/032722
PCT Pub. Date: Mar. 25, 2010

(65) Prior Publication Data
US 2011/0169229 A1 Jul. 14, 2011

(30) Foreign Application Priority Data
Sep. 18, 2008 (JP) ................................ 2008-239669

(51) Int. Cl.
*F16J 15/08* (2006.01)
*F16J 15/10* (2006.01)
*F16K 3/02* (2006.01)
*F16K 51/02* (2006.01)

(52) U.S. Cl.
CPC .............. *F16J 15/104* (2013.01); *F16J 15/102* (2013.01); *F16K 3/0218* (2013.01); *F16K 3/0227* (2013.01); *F16K 51/02* (2013.01)
USPC ......................................... 277/626; 277/654

(58) Field of Classification Search
CPC .............................. F16J 15/104; F16J 15/102
USPC .................................. 277/626–627, 650–654
See application file for complete search history.

(56) References Cited

U.S. PATENT DOCUMENTS 3,322,433 A * 5/1967 Rentschler .................... 277/652
4,375,290 A * 3/1983 Zucchi et al. ................. 277/608
(Continued)

FOREIGN PATENT DOCUMENTS

JP 61038271 A 2/1986
JP 8227876 A 9/1996
(Continued)

*Primary Examiner* — Vishal Patel
(74) *Attorney, Agent, or Firm* — The Webb Law Firm

(57) ABSTRACT

In a vacuum gate valve, a seal member for sealing a gate opening part is bonded to an outer edge part of a planar seal plate that is disposed in such a manner that the planar seal plate is opposed to a valve seat surface of the gate opening part and comes into contact with the valve seat surface. The seal member includes a vacuum seal part that is located on a side farther from the gate opening part and maintains the sealability of the gate opening part when the gate opening part is closed, and also includes a radical seal part that is located on a side closer to the gate opening part and that prevents the seal member from being affected by a treatment gas in the gate opening part when the gate opening part is closed. The vacuum seal part is made of a rubber elastic body, and the radical seal part is configured by providing a radical resistant body that is provided with an excellent radical resistance on the rubber elastic body.

2 Claims, 15 Drawing Sheets

(56) References Cited

U.S. PATENT DOCUMENTS

| | | | |
|---|---|---|---|
| 4,968,854 A * | 11/1990 | Benn et al. | 174/354 |
| 5,558,741 A * | 9/1996 | Balcerski et al. | 156/244.11 |
| 5,722,668 A | 3/1998 | Rice et al. | |
| 6,089,543 A * | 7/2000 | Freerks | 251/357 |
| 6,173,970 B1 * | 1/2001 | Choudary et al. | 277/644 |
| 6,589,664 B1 * | 7/2003 | Kobayashi et al. | 428/516 |
| 6,629,682 B2 * | 10/2003 | Duelli | 251/158 |
| 6,733,015 B2 * | 5/2004 | Forry et al. | 277/590 |
| 6,755,422 B2 * | 6/2004 | Potter | 277/652 |
| 6,932,354 B2 * | 8/2005 | Kane et al. | 277/608 |
| 8,074,967 B2 * | 12/2011 | Tsuji | 251/328 |
| 2002/0135139 A1 * | 9/2002 | Tanaka et al. | 277/650 |
| 2004/0232627 A1 * | 11/2004 | Corbett, Jr. | 277/602 |
| 2006/0273277 A1 | 12/2006 | Heller et al. | |
| 2007/0075503 A1 | 4/2007 | Hayashi et al. | |
| 2007/0182106 A1 * | 8/2007 | Biesenberger et al. | 277/607 |
| 2009/0109607 A1 * | 4/2009 | Rupp | 361/679.01 |

FOREIGN PATENT DOCUMENTS

| | | |
|---|---|---|
| JP | 11002328 A | 1/1999 |
| JP | 2001512897 A | 8/2001 |
| JP | 2002228043 A | 8/2002 |
| JP | 2003056724 A | 2/2003 |
| JP | 2007120738 A | 5/2007 |
| WO | 2006130546 A2 | 12/2006 |

* cited by examiner

SEAL PLATE, SEAL MEMBER THAT IS USED IN SEAL PLATE, AND METHOD FOR MANUFACTURING THE SAME

TECHNICAL FIELD

The present invention relates to a seal plate, a seal member that is used in the seal plate, and a method for manufacturing the seal plate and the seal member that are disposed in a vacuum gate valve that is used for a semiconductor manufacturing apparatus or the like.

BACKGROUND ART

For a conventional semiconductor manufacturing apparatus for producing a silicon wafer, a processing and a treatment of a work such as an ion plating and a plasma etching have been carried out in a clean environment of a high vacuum, and a vacuum gate valve has been used in a gate opening part that is a taking part in and out of such a work.

For a semiconductor manufacturing apparatus that is shown in FIG. 11 for instance, a vacuum gate valve 104 is used to seal a gate opening part 110 that is configured for taking a wafer in and out between a process chamber 106 and a transfer chamber 108.

A seal plate 102 that is used in the vacuum gate valve 104 is made of a metal such as aluminum, and a seal member 100 is made of an elastic member such as a fluorine rubber.

In the case in which the gate opening part 110 is closed, the seal plate 102 is moved to a position which is opposed to a valve seat surface 112 of the gate opening part 110, the seal plate 102 is moved toward the gate opening part 110, and the seal member 100 of the seal plate 102 is made to come into contact with the valve seat surface 112 of the gate opening part 110 to seal the inside of the process chamber 106.

The seal plate that is configured as described above is configured by mounting a seal member 100a in a generally circular shape in a cross section into a groove 114 that has been formed on the outer edge part of a seal plate 102a as shown in FIG. 12. Moreover, the seal plate that is configured as described above is configured by bonding a seal member 100b in a generally rectangular shape in a cross section into a depressed part 116 that has been formed on the outer edge part of a seal plate 102b as shown in FIG. 13.

In the case in which the seal plates 102a and 102b that are configured as described above are used for a semiconductor manufacturing apparatus as described above in particular, the seal members 100a and 100b are exposed to a treatment gas such as a corrosive gas and an active gas that are used in the process chamber 106.

In the case in which the seal members 100a and 100b are exposed to such a treatment gas, a reaction occurs to deteriorate the sealability by slow degrees, and the sealability cannot be maintained for the last time.

In recent years, since an environment of usage for the seal plates 102a and 102b of the vacuum gate valve 104 has been severe, the seal members 100a and 100b that are made of a material that is provided with a more excellent plasma resistance have been used. However, the durability is not sufficient and a cost is higher in the present state of things.

Consequently, in the Patent Literature 1 as shown in FIG. 14, a groove 216 is formed at the position close to a gate opening part 210 of a seal plate 202 separately from a seal member 200 that has been mounted into a groove 214 of the outer edge part of a seal plate 202, and an auxiliary seal member 218 made of a fluorine resin that is provided with a resistance characteristic to a treatment gas is disposed in the groove 216 to configure a double seal structure what has been referred to as.

By configuring such a double seal structure, in the case in which the seal member 200 is made to come into contact with a valve seat surface 212 to carry out a sealing, the auxiliary seal member 218 comes into contact with the valve seat surface 212 and the seal member 200 can be prevented from being exposed to a treatment gas that is moved from the gate opening part 210.

Moreover, in the Patent Literature 2 as shown in FIG. 15, for a seal member 300 that has been mounted into a groove 314 of the outer edge part of a seal plate 302, the side close to the gate opening part 310 for the seal member 300 is covered by a substance such as a fluorine resin member 318 that is provided with a resistance characteristic to a treatment gas to configure a jacket seal structure what has been referred to as.

By configuring such a jacket seal structure, in the case in which the seal member 300 is made to come into contact with a valve seat surface 312 to carry out a sealing, the seal member 300 can be prevented from being exposed to a treatment gas that is moved from the gate opening part 310.

PRIOR ART DOCUMENTS

Patent Literature

[Patent Literature 1]
Japanese Patent Application Laid-Open Publication No. 2002-228043
[Patent Literature 2]
Japanese Patent Application Laid-Open Publication No. 11-002328

SUMMARY OF INVENTION

Problems to be Solved by the Invention

However, for the seal plate 202 that is provided with the double seal structure described in the Patent Literature 1, the number of parts is increased by the auxiliary seal member 218 and two grooves 214 and 216 are required to be formed, whereby a space of a seal part is enlarged and a seal plate 202 becomes large-sized unfortunately.

Moreover, since the auxiliary seal member 218 made of a fluorine resin is not provided with an elastic property or flexibility unlike a rubber, the sealability cannot be sufficiently brought out to a strain of the valve seat surface 212 and a dispersion of dimensions in some cases.

In the case in which a sealing is carried out, since the valve seat surface 212 directly comes into contact with the auxiliary seal member 218 to apply a load to the auxiliary seal member 218, the auxiliary seal member 218 is worn away to generate a particle in some cases.

Moreover, since the seal member 200 is only disposed in the groove 214, the seal member 200 adheres to the valve seat surface 212 and the seal member 200 drops out of the groove 214 in some cases unfortunately.

However, for the seal member 300 that is provided with the jacket seal structure described in the Patent Literature 2, in the case in which the seal member 300 rolls in the groove 314 even if only slightly, the seal member 300 cannot be prevented from being exposed to a treatment gas and an advantageous effect is hard to be obtained unfortunately.

In the case in which a sealing is carried out, since the valve seat surface 312 comes into contact with the boundary line of the seal member 300 and the fluorine resin member 318, the fluorine resin member 318 is easily detached from the seal member 300 unfortunately.

Moreover, since the seal member 300 is only disposed in the groove 314 that has been formed on the seal plate 302 similarly to the Patent Literature 1, the seal member 300 adheres to the valve seat surface 312 and the seal member 300 drops out of the groove 314 in some cases unfortunately.

The present invention was made in consideration of such conditions, and an object of the present invention is to provide a seal plate, a seal member that is used in a seal plate, and a method for manufacturing the seal plate and the seal member, in which the life of a seal member is extended by preventing the seal member that is used in a seal plate from being exposed to a treatment gas, and the seal member is prevented from dropping out of a groove of a seal plate and rolling in a groove.

SUMMARY OF THE INVENTION

The present invention was made in order to solve the above described problems of the conventional art and to achieve the purpose. A seal member in accordance with the present invention is characterized by a seal member for sealing a gate opening part by being bonded to the outer edge part of a planar seal plate that is disposed in such a manner that the planar seal plate is opposed to the valve seat surface of the gate opening part and by coming into contact with the valve seat surface for a vacuum gate valve. The seal member bonded to the outer edge part is comprised of a vacuum seal part that is located on the side far from the gate opening part and that maintains the sealability of the gate opening part in the case in which the gate opening part is closed, and a radical seal part that is located on the side close to the gate opening part and that prevents the seal member from being affected by a treatment gas in the gate opening part in the case in which the gate opening part is closed, wherein the vacuum seal part is made of a rubber elastic body, and the radical seal part is configured by providing a radical resistant body that is provided with an excellent radical resistance on the rubber elastic body.

By a seal member that is provided with the both of the vacuum seal part and the radical seal part as described above, a treatment gas can be sealed by the radical seal part, whereby the vacuum seal part can seal the gate opening part in a certain manner without exposing the vacuum seal part to a treatment gas and the life of the seal member can be dramatically extended.

Moreover, since it is a given fact that the seal member is bonded to the outer edge part of the seal plate, in the case in which the seal member is used in the vacuum gate valve, the seal member can be prevented from dropping out of a groove of the seal plate and rolling in a groove. Consequently, in the case in which the seal member is applied to the vacuum gate valve of a semiconductor manufacturing apparatus, a semiconductor can be manufactured in an efficient fashion without stopping a manufacture of a semiconductor.

Moreover, in the case in which the seal member is produced by using such a material, the vacuum seal part can seal the gate opening part in a certain manner, and the vacuum seal part can be protected from a treatment gas for the radical seal part.

Furthermore, since the radical seal part has a structure in which a radical resistant body is disposed on the rubber elastic body, in the case in which a thickness of the radical resistant body is smaller than that of the rubber elastic body, a load that is applied to the radical resistant body can be absorbed by a deformation of the rubber elastic body that has been disposed on the lower side even in the case in which the radical resistant body is not provided with an elastic property.

Consequently, even in the case in which a load is applied to the radical resistant body in a repetitive manner due to a repeated usage, a permanent deformation does not occur and the radical resistant body can be used over a long period of time.

A seal member in accordance with the present invention is characterized in that the radical resistant body is formed in an extending manner from the rubber elastic body of the radical seal part to the seal plate.

By the above configuration, the radical resistant body can protect a junction end part of the seal plate that is located on the side of the gate opening part and the rubber elastic body of the radical seal part, a treatment gas can be prevented from flowing into a space between the seal plate and the seal member, and the vacuum seal part can be protected from a treatment gas in a certain manner.

A seal member in accordance with the present invention is characterized in that the vacuum seal part and the rubber elastic body of the radical seal part are configured in an integrated manner, and are bonded to a depressed part that is formed at the outer edge part of the seal plate.

In the case in which the vacuum seal part and the rubber elastic body of the radical seal part are configured in an integrated manner as described above, since a space of a seal part can be reduced for the seal plate that is bonded to the seal member, the seal plate can be prevented from being enlarged too much and an installation can be easily carried out.

Moreover, in the case in which the seal member is configured in an integrated manner, only one metal mold for forming can be used and the productivity can be implemented satisfactorily.

Furthermore, only one depressed part can be formed on the seal plate, whereby a processing can be easily carried out and a production cost can be suppressed.

A seal member in accordance with the present invention is characterized in that the rubber elastic body of the radical seal part and the radical resistant body are bonded to each other.

In the case in which the rubber elastic body of the radical seal part and the radical resistant body are bonded to each other as described above, the seal member can be prevented from dropping out and a handling property of the seal member is excellent.

A seal member in accordance with the present invention is characterized in that the rubber elastic body of the radical seal part and the radical resistant body are laminated to each other in a separable manner.

In the case in which the rubber elastic body of the radical seal part and the radical resistant body are laminated to each other in a separable manner as described above, since only a portion of the radical resistant body can be exchanged, a cost for the exchange can be suppressed.

A seal member in accordance with the present invention is characterized in that the vacuum seal part comes into contact with the valve seat surface at least before the radical seal part comes into contact with the valve seat surface.

In the case in which the vacuum seal part comes into contact with the valve seat surface before the radical seal part comes into contact with the valve seat surface as described above, since a large load is not applied to the radical seal part, a protection of the vacuum seal part from a treatment gas, which is a primary role of the radical seal part, can be maintained over a long period of time.

A seal member in accordance with the present invention is characterized in that a root part in a generally symmetrical shape is formed on the both sides of the radical seal part in a vertical longitudinal cross sectional shape of the seal member.

In the case in which a root part is formed on the both sides of the radical seal part as described above, the radical seal part is deformed uniformly to right and left in the case in which the radical seal part comes into contact with the valve seat surface, whereby the radical seal part can be prevented from leaning to one side and can be prevented from being damaged.

Moreover, in the case in which a root part is formed on only one side of the radical seal part, the seal member is moved in a horizontal direction in some cases. However, in the case in which a root part is formed on the both sides of the radical seal part, the seal member can be prevented from being moved in a horizontal direction and the radical resistant body can be suppressed from being worn away.

A seal plate in accordance with the present invention is characterized in that the seal member as defined in any one of the above is bonded to the outer edge part of the seal plate, and wherein the seal plate is disposed in such a manner that the seal plate is opposed to the valve seat surface of the gate opening part, and the valve seat surface and the seal member come into contact with each other to seal the gate opening part.

By the seal plate in which the seal member that is provided with the vacuum seal part and the radical seal part as described above is bonded to the outer edge part of the seal plate, the vacuum seal part can be protected from a treatment gas in a certain manner and the seal member can be prevented from dropping out of the outer edge part. Consequently, a prescribed function for the vacuum gate valve can be maintained in a repetitive manner.

A seal plate in accordance with the present invention is characterized by further comprising a small step part formed at an edge of the depressed part of the seal plate.

In the case in which a small step part is formed as described above, since the rubber elastic body that is expanded due to a heat can be suppressed from being expanded at a breakneck pace in the case in which a heat is applied to the rubber elastic body, the radical resistant body can be prevented from being detached.

A seal plate in accordance with the present invention is characterized in that a top part of a radical seal part that comes into contact with the valve seat surface is a flat surface that is generally parallel to the valve seat surface.

In the case in which a top part of a radical seal part that comes into contact with the valve seat surface is a flat surface as described above, since an area that comes into contact with the valve seat surface is larger as compared with the case of a normal circular arc shape, a load that is applied from the valve seat surface for a unit area can be reduced and the radical resistant body can be suppressed from being worn away.

A method for manufacturing a seal member in accordance with the present invention is a method for manufacturing a seal member for sealing a gate opening part by being bonded to a depressed part that is formed on the outer edge part of a planar seal plate that is disposed in such a manner that the planar seal plate is opposed to the valve seat surface of the gate opening part and by coming into contact with the valve seat surface for a vacuum gate valve. The method for manufacturing the seal member in accordance with the present invention is characterized by comprising at least the steps of:

preparing the seal plate;

bonding a raw material of the seal member into the depressed part of the seal plate;

disposing the radical resistant body on the raw material of the seal member and on the inner side of the depressed part of the seal plate;

hot-pressing a pressing member on the radical resistant body disposed on the raw material of the seal member and carrying out a thermo compression bonding of the seal plate and at least part of the radical resistant body;

disposing a metal mold that is provided with a depressed part configured to form a vacuum seal part that is located on the outer side of the depressed part of the seal plate and that maintains the sealability of the gate opening part in the case in which the gate opening part is closed and a depressed part configured to form a radical seal part that is located on the inner side of the depressed part of the seal plate and that prevents the seal member from being affected by a treatment gas in the gate opening part in the case in which the gate opening part is closed, on the raw material of the seal member on which the radical resistant body is disposed; and heating the disposed metal mold and moving the metal mold in a direction of the seal plate to form the vacuum seal part and the radical seal part of the seal member.

In the case in which a seal member is manufactured by such a method for manufacturing a seal member as described above, since the vacuum seal part and the radical seal part are formed by using a metal mold after a thermo compression bonding of the seal plate and at least part of the radical resistant body is carried out, a raw material of the seal member can be prevented from flowing to the inside of the seal plate during a forming that is carried out by using a metal mold.

Moreover, in the case in which a seal member is manufactured by such a method as described above, since a rubber material can be prevented from flowing to the inside of the seal plate and a burr can be prevented from being generated, the productivity can be implemented satisfactorily.

Furthermore, in the case in which the seal plate is obtained by such a manufacturing method as described above, the vacuum seal part can be protected from a treatment gas in a certain manner and the seal member can be prevented from dropping out of the depressed part of the outer edge part. Consequently, a prescribed function for the vacuum gate valve can be maintained in a repetitive manner.

A method for manufacturing a seal plate in accordance with the present invention is characterized by comprising the steps of forming the seal member by the method for manufacturing as defined above.

In the case in which the seal plate is obtained by such a manufacturing method as described above, the vacuum seal part can be protected from a treatment gas in a certain manner and the seal member can be prevented from dropping out of the depressed part of the outer edge part. Consequently, a prescribed function for the vacuum gate valve can be maintained in a repetitive manner.

Advantageous Effects of Invention

In accordance with the present invention, the seal member is provide with the vacuum seal part and the radical seal part, and the rubber elastic body that configures the vacuum seal part and the radical seal part is bonded to the outer edge part of the seal plate. Consequently, the present invention can provide a seal plate, a seal member that is used in a seal plate, and a method for manufacturing the seal plate and the seal member, in which the life of a seal member is extended by preventing the seal member that is used in a seal plate from being exposed to a treatment gas, and the seal member is prevented from dropping out of a groove of a seal plate and rolling in a groove.

Moreover, the radical seal part is configured by covering the rubber elastic body with the radical resistant body that is provided with an excellent corrosion resistance and an excellent radical resistance. Consequently, the present invention can provide a seal plate, a seal member that is used in a seal plate, and a method for manufacturing the seal plate and the seal member, in which the radical seal part is provided with an excellent protection function to a treatment gas such as a corrosive gas and an active gas and the life can be dramatically extended.

BRIEF DESCRIPTION OF THE DRAWINGS

FIG. 1 is a schematic cross-sectional view showing a vacuum gate valve that is provided with a seal member in accordance with an embodiment of the present invention.
FIG. 2 is a front elevation view showing a seal plate that is provided with a seal member in accordance with an embodiment of the present invention.
FIG. 3 is a schematic cross-sectional view showing a seal plate that is provided with a seal member in accordance with a first embodiment of the present invention.
FIG. 4 is a schematic cross-sectional view showing a seal plate that is provided with a seal member in accordance with a second embodiment of the present invention.
FIG. 5 is a schematic cross-sectional view showing a seal plate that is provided with a seal member in accordance with a third embodiment of the present invention.
FIG. 6 is a schematic cross-sectional view showing a seal plate that is provided with a seal member in accordance with a fourth embodiment of the present invention.
FIG. 7 is a schematic cross-sectional view showing a seal plate that is provided with a seal member in accordance with a fifth embodiment of the present invention.
FIG. 8 is a schematic cross-sectional view showing a seal plate that is provided with a seal member in accordance with a sixth embodiment of the present invention.
FIG. 9 is a manufacturing process drawing for describing a manufacturing method of a seal plate that is provided with a seal member in accordance with an embodiment of the present invention.
FIG. 10 is a manufacturing process drawing for describing a manufacturing method of a seal plate that is provided with a seal member in accordance with an embodiment of the present invention.
FIG. 11 is a schematic cross-sectional view showing a conventional vacuum gate valve.
FIG. 12 is a schematic cross-sectional view showing a conventional seal plate in which a seal member is mounted in a groove.
FIG. 13 is a schematic cross-sectional view showing a conventional seal plate in which a seal member is mounted in a groove.
FIG. 14 is a schematic cross-sectional view showing a conventional seal plate that is provided with a double seal structure.
FIG. 15 is a schematic cross-sectional view showing a conventional seal plate that is provided with a jacket seal structure.

DESCRIPTION OF EMBODIMENTS

Figure 1:
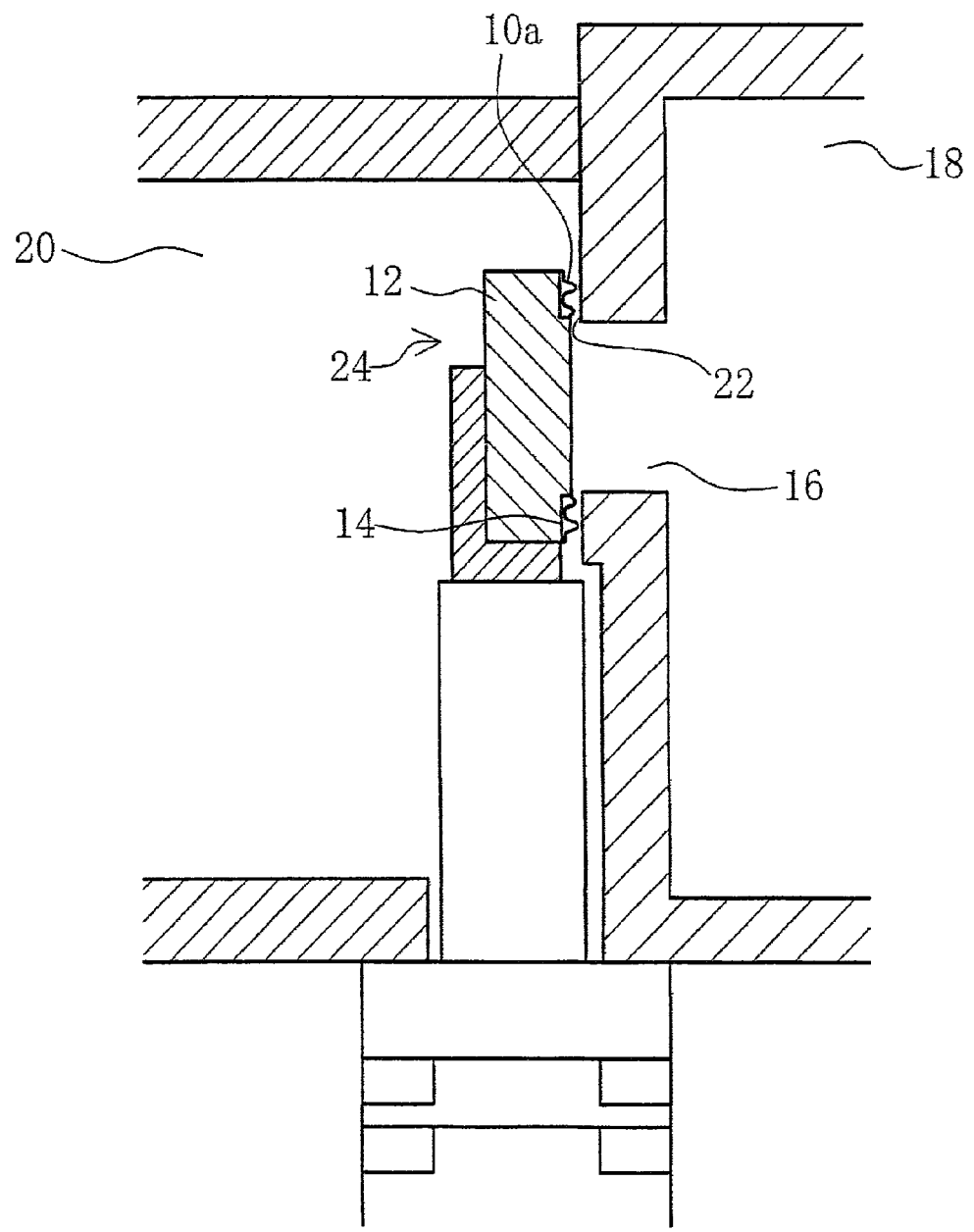
[FIG. 1]
Figure 2:
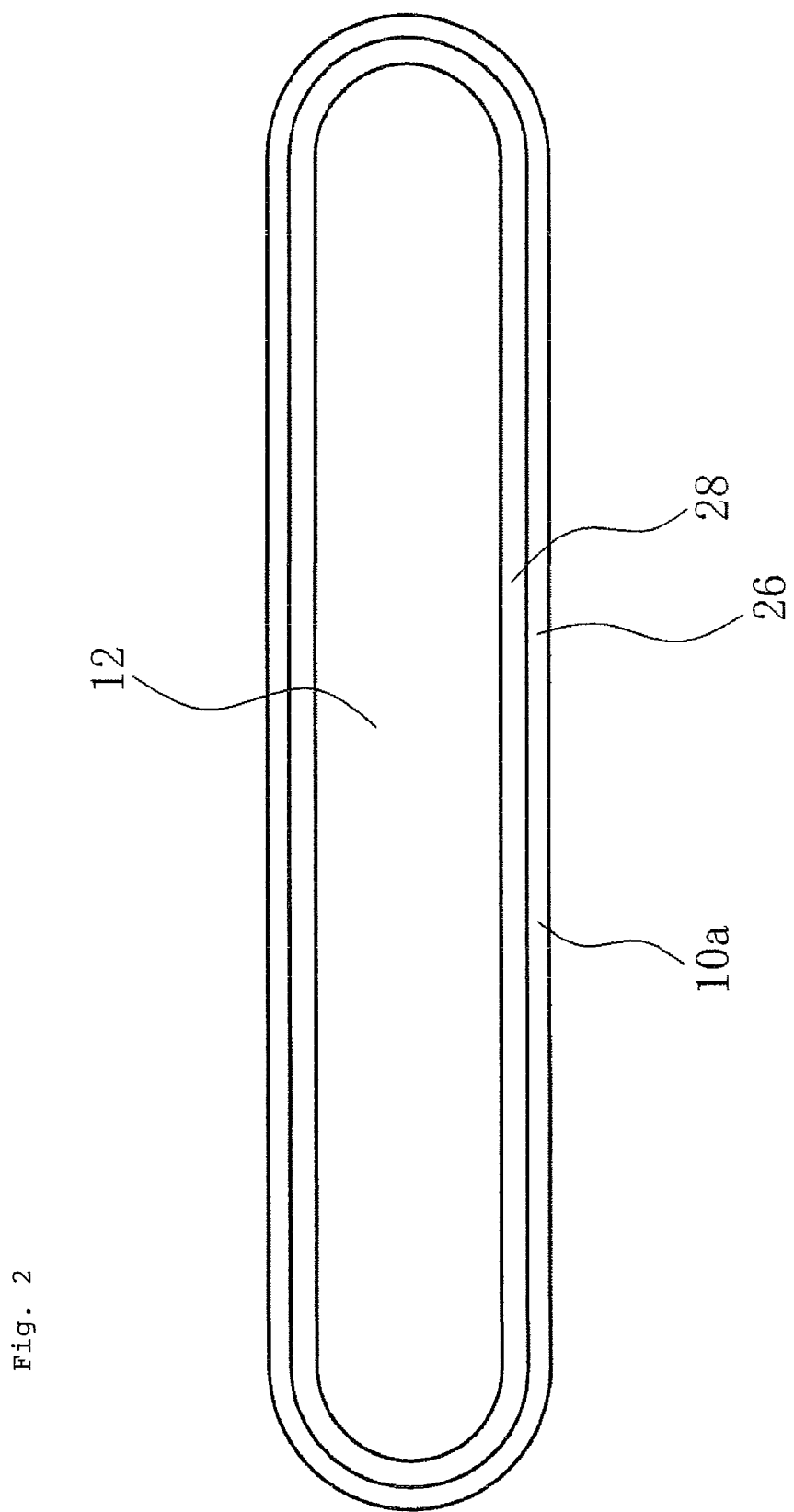
[FIG. 2]
Figure 3:
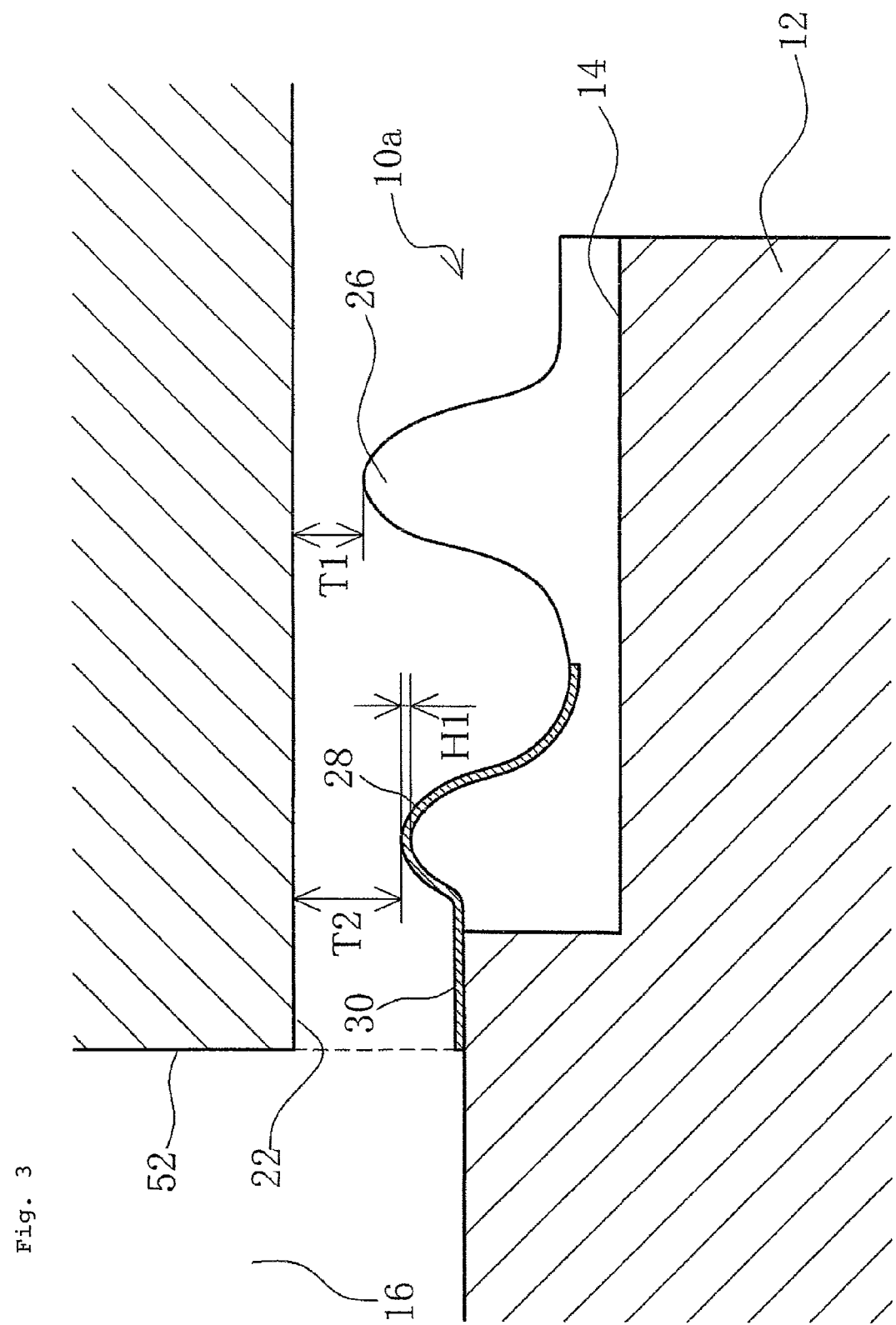
[FIG. 3]

An embodiment (example) of the present invention will be described below in detail with reference to the drawings.
FIG. 1 is a schematic cross-sectional view showing a vacuum gate valve that is provided with a seal member in accordance with an embodiment of the present invention. FIG. 2 is a front elevation view showing a seal plate that is provided with a seal member in accordance with an embodiment of the present invention. FIG. 3 is a schematic cross-sectional view showing a seal plate that is provided with a seal member in accordance with a first embodiment of the present invention. FIGS. 4 to 8 are the schematic cross-sectional views showing a seal plate that is provided with a seal member in accordance with the second to sixth embodiments of the present invention.
A seal plate in accordance with the present invention and a seal member that is used for the seal plate are user for a vacuum gate valve that has been formed in a gate opening part that is a taking part in and out of a work for a semiconductor manufacturing apparatus or the like.
A seal member in accordance with the present invention and a seal plate that is configured by bonding the seal member to a depressed part will be described in detail in the following.
<Seal Member 10a and Seal Plate 12>
For a semiconductor manufacturing apparatus that is shown in FIG. 1, a seal member 10a and a seal plate 12 in accordance with the present invention are disposed in a vacuum gate valve 24 that is used to seal a gate opening part 16 that is configured for taking a wafer in and out between a process chamber 18 and a transfer chamber 20.
The seal plate 12 that is disposed in the vacuum gate valve 24 is made of a metal such as aluminum, and a seal member 10a that is made of a rubber elastic body such as a fluorine rubber is bonded to a depressed part 14 that is formed on a peripheral edge part of the seal plate 12 via an adhesive agent. The adhesive agent is not restricted in particular. However, in the case in which a silane coupling agent or a polyimide series adhesive agent is used as an adhesive agent for instance, the seal member 10a can be prevented from being detached in a favorable manner even in the case in which the vacuum gate valve 24 is used in a repetitive manner.
In the case in which the gate opening part 16 is closed, the seal plate 12 is moved to a position which is opposed to a valve seat surface 22 of the gate opening part 16, the seal plate 12 is moved toward the gate opening part 16, and the seal member 10a of the seal plate 12 is made to come into contact with the valve seat surface 22 of the gate opening part 16 to seal the inside of the process chamber 18.
The seal plate 12 is a plate like body that is configured to be in a generally rectangular shape as shown in FIG. 2. The seal member 10a that is bonded to the depressed part 14 that is formed on a peripheral edge part of the seal plate 12 is configured to be in a circular pattern. The seal member 10a that is configured to be in a circular shape is formed in accordance with a size of the seal plate 12 in an appropriate manner. By forming the seal member 10a to be in a circular shape, the gate opening part 16 can be sealed in an air proof manner.

For the seal plate 12 as shown in FIG. 3 in detail, a vacuum seal part 26 that maintains the sealability of the gate opening part 16 in the case in which the gate opening part 16 is closed is formed on the side far from the gate opening part 16 (on the outer circumferential side of the seal plate 12) and a radical seal part 18 that prevents the seal member 10a from being affected by a treatment gas in the gate opening part 16 in the case in which the gate opening part 16 is closed is formed on the side close to the gate opening part 16 (on the inner circumferential side of the seal plate 12) in the depressed part 14 that has been formed on the outer edge part of the seal plate 12.

The vacuum seal part 26 is made of a rubber elastic body. It is preferable to use an FKM (a vinylidene fluoride series fluoro elastomer) or an FFKM (a tetrafluoroethylene perfluoro alkyl vinyl ether series perfluoro elastomer) as such a rubber elastic body. The FKM is suitable in consideration of a permeation property and a cost phase of a treatment gas in particular.

On the other hand, a radical resistant body 30 that is extended to the seal plate 12 is formed on the rubber elastic body for the radical seal part 28. By this configuration, the radical resistant body 30 comes into contact with a valve seat surface 22 in the case in which the gate opening part 16 is closed, and can protect the vacuum seal part 26 from a treatment gas such as a corrosive gas and an active gas.

It is preferable that the radical resistant body 30 is made of a material that is provided with an excellent resistance characteristic to a treatment gas. A material such as a PTFE, a PFA, polyimide, a metal thin film, and an FFKM can be used as the radical resistant body 30, and the PTFE that is provided with an excellent radical resistant characteristic is most suitable for the radical resistant body in particular.

In the case in which the radical resistant body 30 is made of a material that is not provided with the rubber elasticity, the radical resistant body 30 is formed in a sheet shape and is disposed on a rubber elastic body in the present embodiment. By this configuration, in the case in which the gate opening part 16 is closed, most of a load that is applied to the radical resistant body 30 can be absorbed by the rubber elastic body that is disposed on the lower layer.

Consequently, a compression permanent deformation does not occur for the radical resistant body 30 even under a severe environment in which a compression and a release is repeated, and the radical resistant body 30 can be used over a long period of time. Moreover, the radical resistant body 30 is not worn away even in the case in which the radical resistant body 30 comes into contact with the valve seat surface 22, thereby preventing a problem caused by a particle, which has conventionally occurred in some cases.

It is preferable that a thickness of the radical resistant body 30 is specified to be a thickness in which a load that is applied to the radical resistant body 30 can be absorbed by the rubber elastic body. It is preferable that a thickness H1 of the radical resistant body 30 is specified to be in the range of 10 μm to 300 μm for instance.

Moreover, since the radical resistant body 30 is formed in an extending manner from the rubber elastic body of the radical seal part 28 to the seal plate 12, the radical resistant body 30 can protect a junction end part of the seal plate 12 that is located on the side of the gate opening part 16 and the rubber elastic body of the radical seal part 28, a treatment gas can be prevented from flowing into a space between the seal plate 12 and the rubber elastic body of the seal member 10a, and the vacuum seal part 26 can be protected from a treatment gas in a certain manner.

It is preferable that a position of one side end part (a right end part in FIG. 3) of the radical seal part 28 is located at a bottommost part of a root part that is formed between the radical seal part 28 and the vacuum seal part 26 in order to prevent the side end part from coming into contact with the valve seat surface 22 and prevent the side end part from being detached in the case in which the radical seal part 28 comes into contact with the valve seat surface 22.

Moreover, it is preferable that a position of the other side end part (a left end part in FIG. 3) is located up to right below a side end part 52 of the valve seat surface 22 since a part further than a position right below a side end part 52 of the valve seat surface 22 (a left side from the position in FIG. 3) is exposed to a treatment gas such as a corrosive gas and an active gas.

For the seal member 10a in accordance with the present embodiment, the vacuum seal part 26 and the radical seal part 28 are projected in a generally chevron shape, and a distance T1 from the valve seat surface 22 to a top of the vacuum seal part 26 is specified to be smaller than a distance T2 from the valve seat surface 22 to a top of the radical seal part 28.

For the seal plate 12 that is configured by bonding the seal member 10a to the depressed part 14, the vacuum seal part 26 comes into contact with the valve seat surface 22 in the first place and the radical seal part 28 comes into contact with the valve seat surface 22 in the second place in the case in which the gate opening part 16 is closed. By this configuration, the vacuum seal part 26 seals the inside of the process chamber 18 and the radical seal part 28 protects the vacuum seal part 26 from a treatment gas in the process chamber 18. Consequently, the sealability can be held satisfactorily even in the case in which the seal member 10a is used in a repetitive manner and the prescribed sealability can be maintained for an extended period of time.

The seal member 10a in accordance with the present invention can be one of the modes that are shown in FIGS. 4 to 8 described in the following in addition to the mode shown in FIG. 3 used in the above description.

The seal members 10b to 10f shown in FIGS. 4 to 8 are provided with a structure equivalent to that of the seal member 10a in accordance with the first embodiment shown in FIGS. 1 to 3 in the elementary sense. Consequently, elements equivalent to those illustrated in FIGS. 1 to 3 are numerically numbered similarly and the detailed descriptions of the equivalent elements are omitted.

Figure 4:
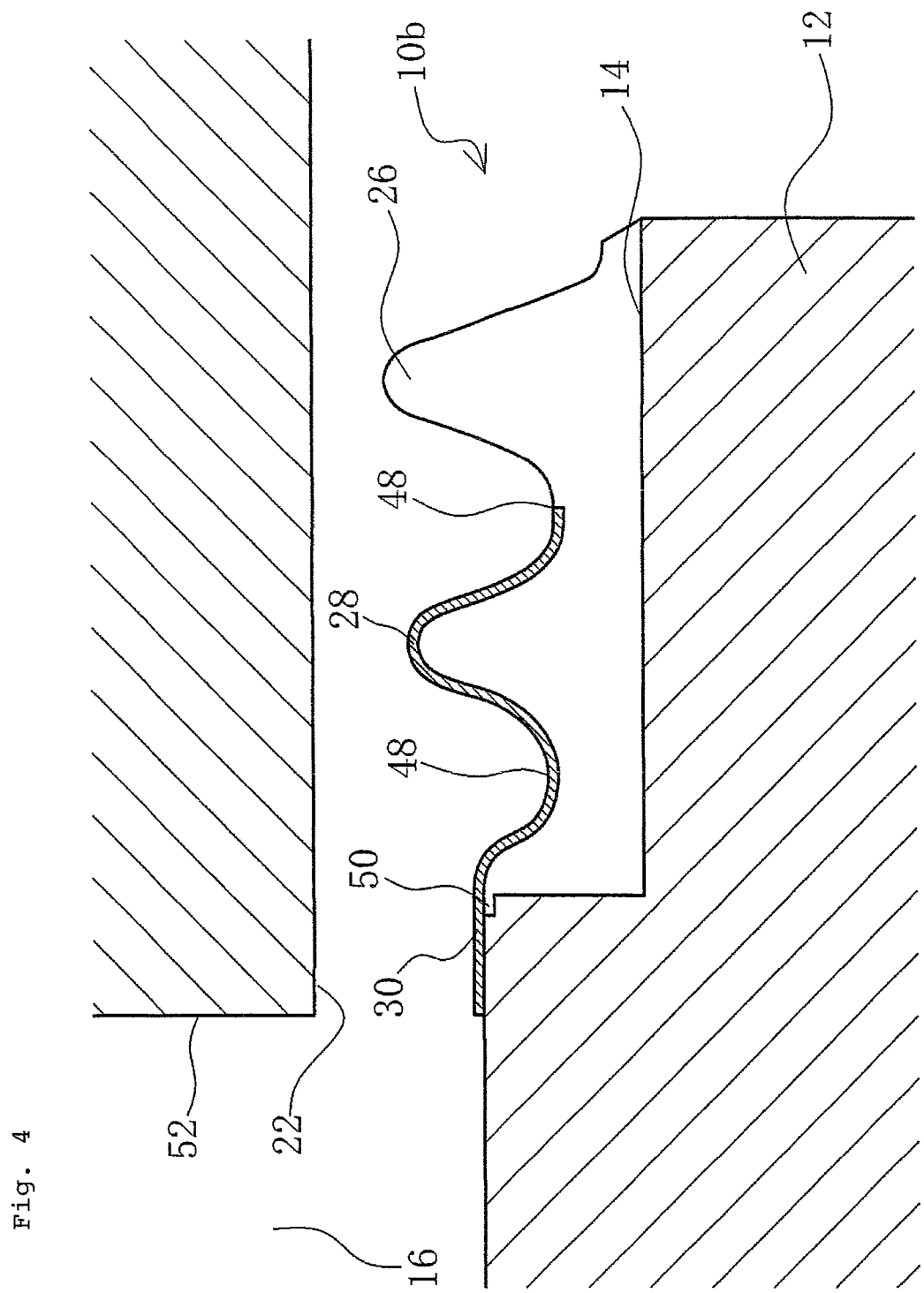
[FIG. 4]

At first, the seal member 10b in accordance with a second embodiment shown in FIG. 4 is different from the first embodiment on the point that the root parts 48 and 48 are formed on the both sides of the radical seal part 28 and a small step part 50 is formed at a boundary end part in which the radical resistant body 30 is formed in an extending manner from the upper side of the depressed part 14 of the seal plate 12 to the upper side of the seal plate 12 for the depressed part 14 of the seal plate 12.

In the case in which the root parts 48 and 48 are formed on the both sides of the radical seal part 28 as described above, the radical seal part 28 is deformed uniformly to right and left in the case in which the radical seal part 28 comes into contact with the valve seat surface 22, whereby the radical seal part 28 can be prevented from leaning to one side and prevented from being damaged.

Moreover, in the case in which a root part 48 is formed on only one side of the radical seal part 28, the seal member 10a is moved in a horizontal direction in some cases since a force is applied to one side. However, in the case in which the root parts 48 and 48 are formed on the both sides of the radical seal part 28, the seal member 10a can be prevented from being moved in a horizontal direction since the radical seal part 28 is deformed uniformly to right and left and the radical resistant body 30 can be suppressed from being worn away.

By the above described reasons, it is preferable that the root parts 48 and 48 that are formed on the both sides of the radical seal part 28 are in a generally symmetrical shape.

Moreover, in the case in which the root parts 48 and 48 is formed, an installation surface can be specified to be longer than that of the radical resistant body 30 in accordance with the first embodiment.

Since the radical resistant body 30 is extremely thin in particular, the radical resistant body 30 is easily curved due to a heat during a forming. However, in the case in which an installation surface is longer, a forming can be carried out while the curvature is returned. By this configuration, the radical resistant body 30 can be bonded to the upper surface of the rubber elastic body without generating a wrinkle.

A length of the radical resistant body 30 is specified in such a manner that a position of one side end part (a right end part in FIG. 4) of the radical resistant body 30 is located at a point that exceeds a vertex of the rubber elastic body that is the radical seal part 28, preferably at point that exceeds a bottom-most part of the root part 48, and a position of the other side end part (a left end part in FIG. 4) is located at a point that exceeds the small step part 50 of the depressed part 14 of the seal plate 12 and that is located up to right below a side end part 52 of the valve seat surface 22.

In the case in which a position of one side end part of the radical resistant body 30 is located at a bottommost part of the root part 48, a stress is most hard to be applied, whereby the radical resistant body 30 can be prevented from being detached from the rubber elastic body in an efficient manner.

The small step part 50 that is formed in the depressed part 14 of the seal plate 12 is configured to prevent a detachment of the radical resistant body 30, which is caused by a thermal expansion of the rubber elastic body.

In the case in which the small step part 50 is formed as described above, since the rubber elastic body that is expanded due to a heat can be suppressed from being expanded at a breakneck pace in the case in which a heat is applied to the rubber elastic body, the radical resistant body 30 that has been formed in an extending manner on the seal plate 12 can be prevented from being detached in an efficient manner in particular.

For the seal member 10a in accordance with the present embodiment, a top part of a radical seal part 28 that comes into contact with the valve seat surface 22 can also be a flat surface (not shown) that is generally parallel to the valve seat surface 22.

In the case in which a top part of a radical seal part 28 that comes into contact with the valve seat surface 22 is a flat surface as described above, since an area that comes into contact with the valve seat surface 22 is larger as compared with the case of a circular arc shape, a load that is applied from the valve seat surface 22 for a unit area can be reduced and the radical resistant body 30 can be suppressed from being worn away.

Figure 5:
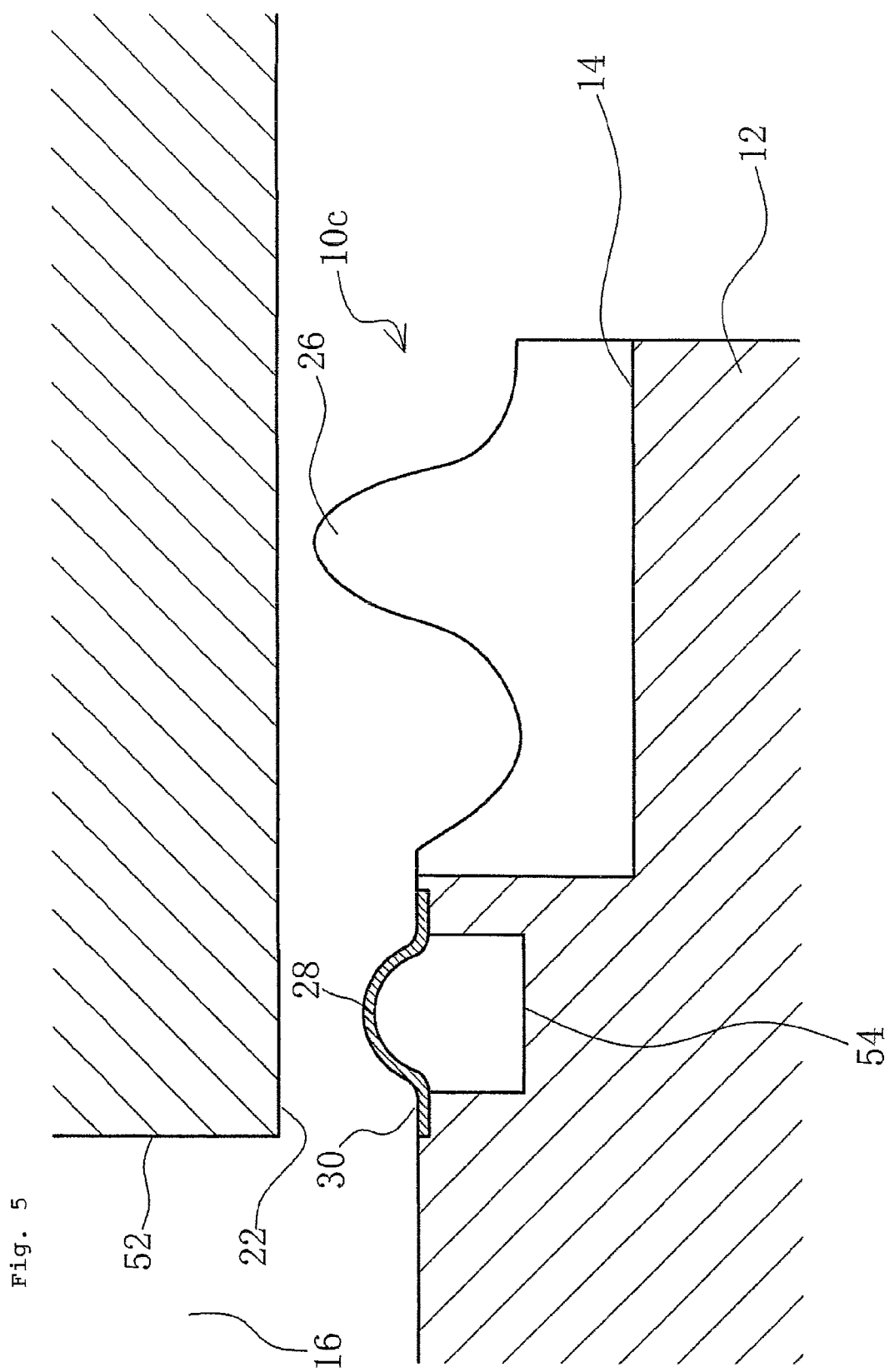
[FIG. 5]

In the next place, the seal member 10c in accordance with a third embodiment shown in FIG. 5 is different from the first embodiment on the point that the radical seal part 28 is configured separately from the vacuum seal part 26.

In this case, the radical seal part 28 is bonded to a groove 54 that is formed inside the depressed part 14 of the seal plate 12.

Figure 6:
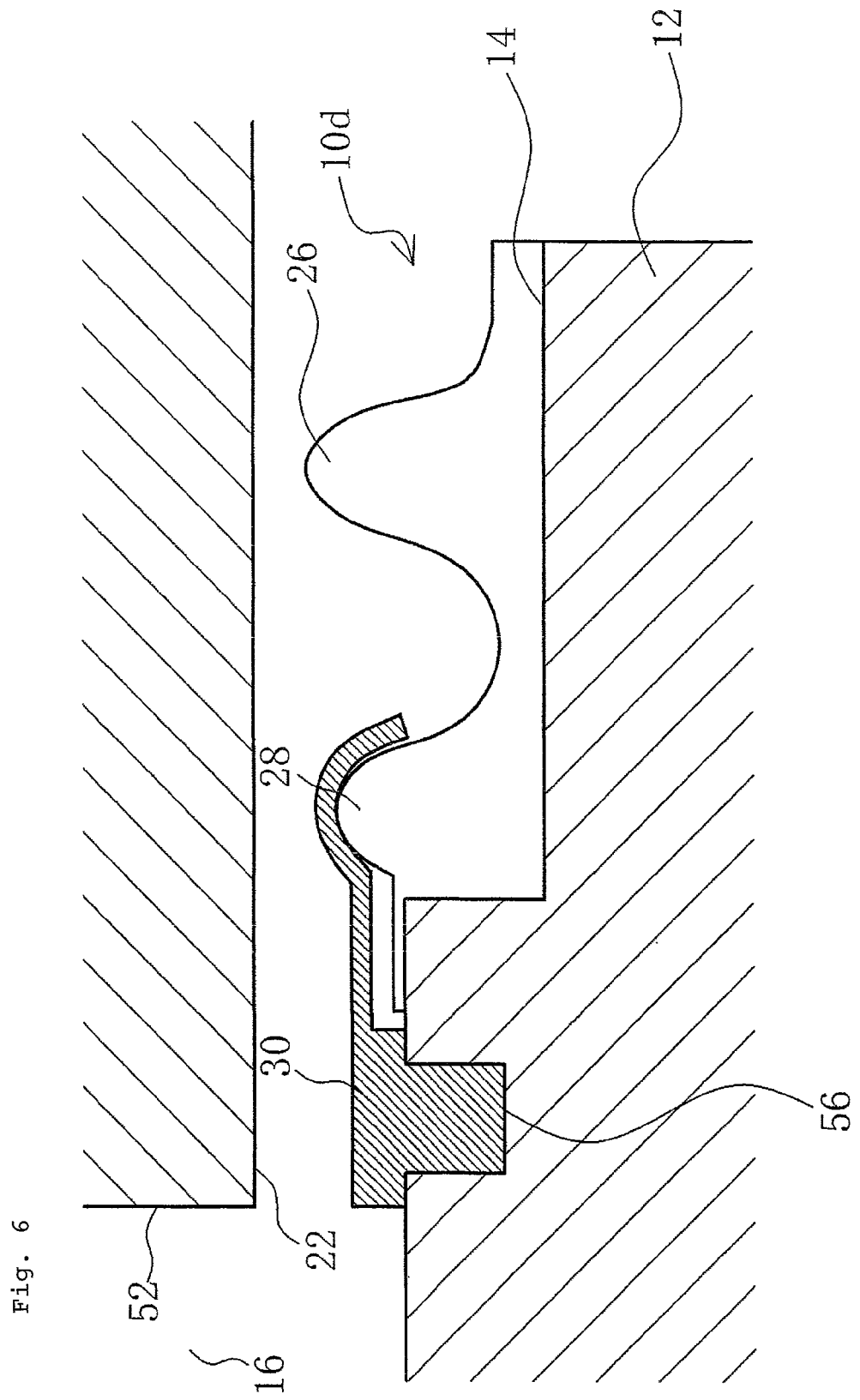
[FIG. 6]

In the next place, the seal member 10d in accordance with a fourth embodiment shown in FIG. 6 is different from the first embodiment on the point that the radical resistant body 30 is configured in such a manner that a part of the radical resistant body 30 is fitted to a groove 56 that is formed inside the depressed part 14 of the seal plate 12.

In this case, since the radical resistant body 30 is not bonded to the rubber elastic body, it is possible to exchange only the radical resistant body 30. Moreover, a material of the radical resistant body 30 can be modified to be used in accordance with a type of a treatment gas.

Figure 7:
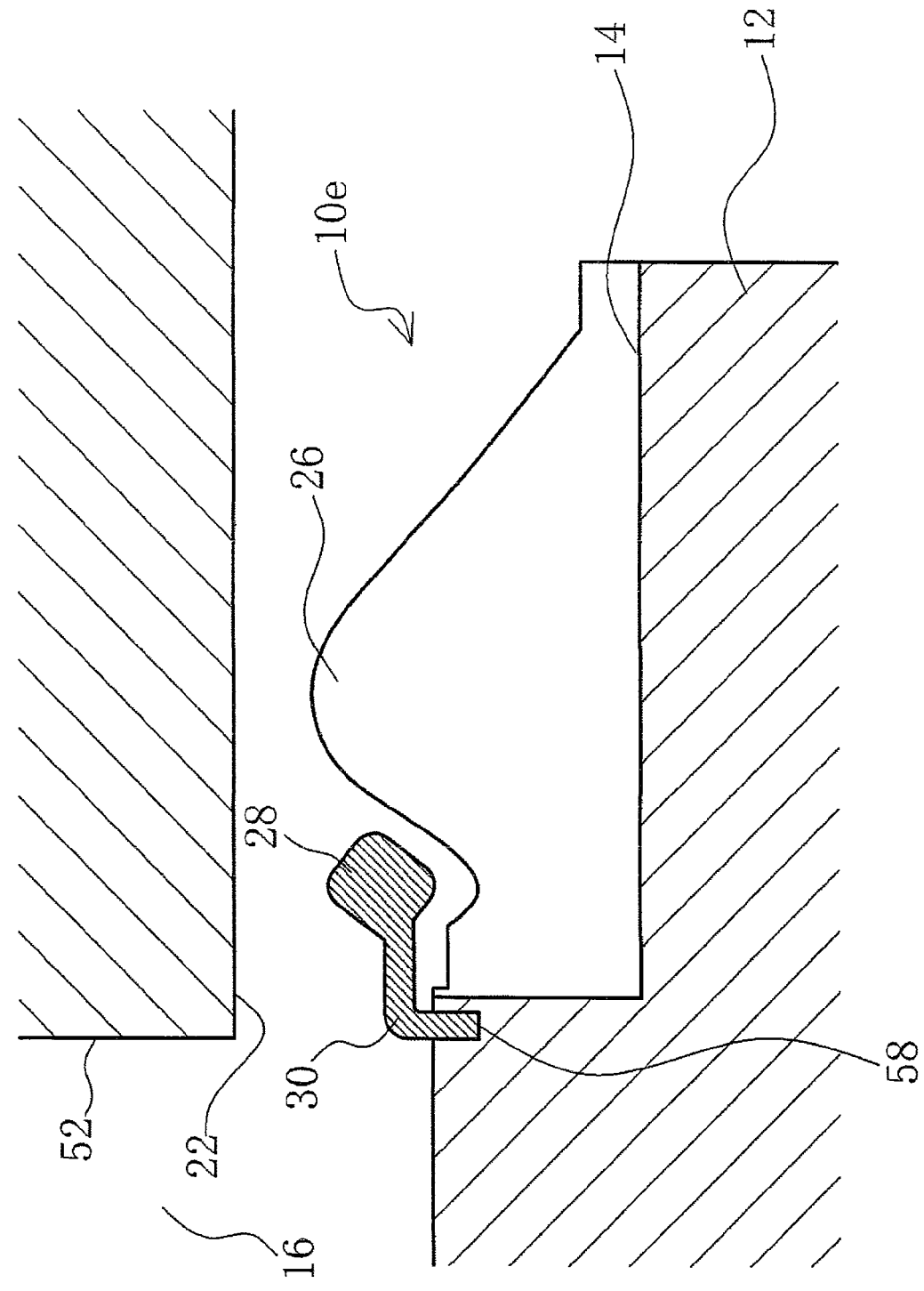
[FIG. 7]

In the next place, the seal member 10e in accordance with a fifth embodiment shown in FIG. 7 is different from the first embodiment on the point that the radical resistant body 30 is configured in such a manner that a part of the radical resistant body 30 is fitted to a groove 58 that is formed inside the depressed part 14 of the seal plate 12 and that a mode of the radical resistant body 30 is in a massive shape.

In the case in which the radical resistant body 30 is in a massive shape as described above, since the radical resistant body 30 is provided with an excellent resistance characteristic to a treatment gas, the seal member 10e can be used for a highly corrosive treatment gas in a favorable manner in particular. Moreover, since the radical resistant body 30 is not bonded to the rubber elastic body, it is possible to exchange only the radical resistant body 30.

Figure 8:
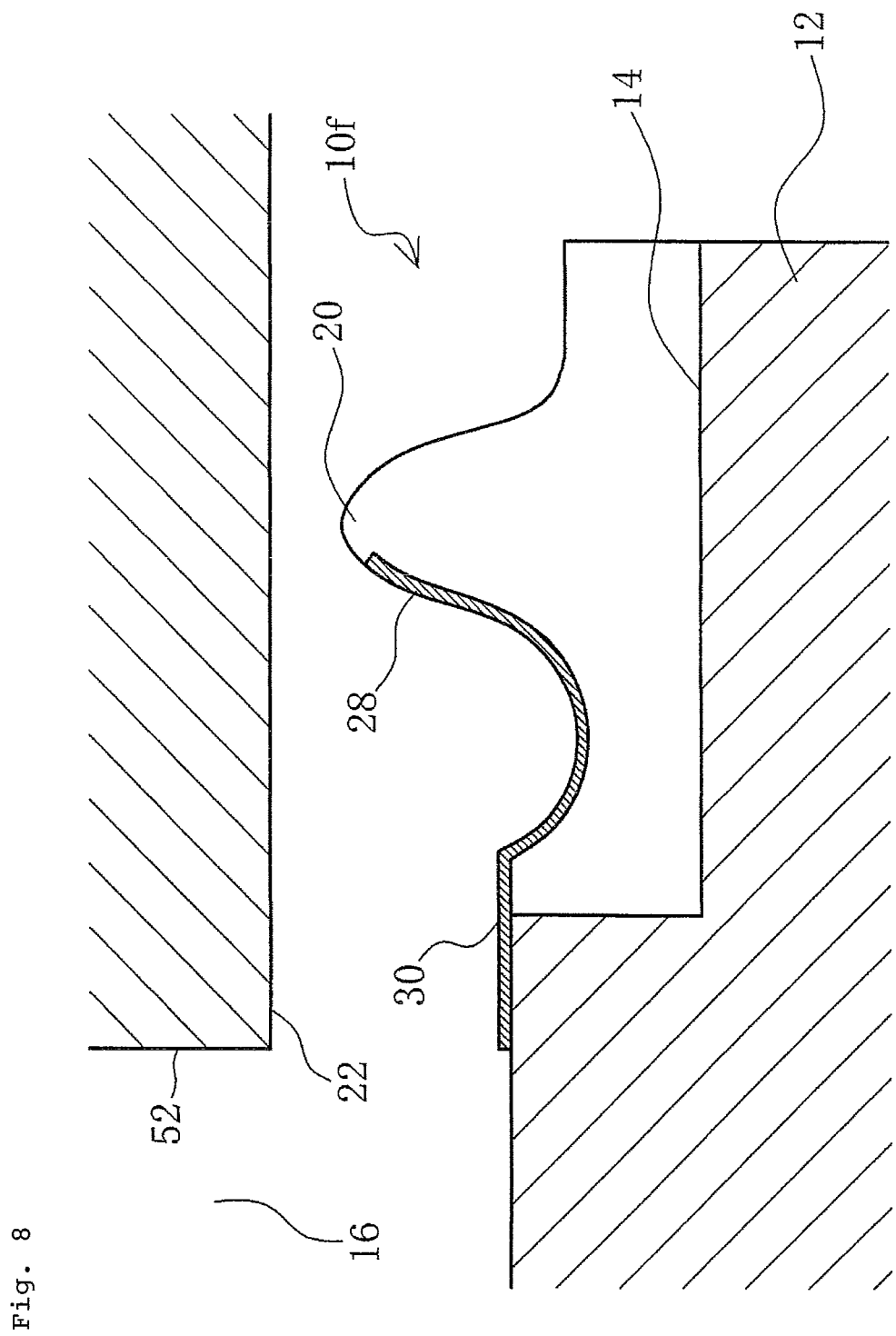
[FIG. 8]

In the next place, the seal member 10f in accordance with a sixth embodiment shown in FIG. 8 is different from the first embodiment on the point that the radical seal part 28 is not projected unlike the vacuum seal part 26.

In this case, the radical resistant body 30 is formed in an extending manner up to a position in which the vacuum seal part 26 comes into contact with the valve seat surface 22 and is pressed in the case in which the gate opening part 16 is closed, that is, a position in which the vacuum seal part 26 is not exposed to a treatment gas from the side of the gate opening part 16 in the case in which the vacuum seal part 26 comes into contact with the valve seat surface 22. Consequently, the vacuum seal part 26 can be prevented from being exposed to a treatment gas.

<Method for Manufacturing a Seal Plate 12 that is Provided with a Seal Member 10>

A seal member 10a described above and a seal plate 12 that is provided with the seal member 10a are produced by the method for manufacturing described in the following for instance.

Figure 9:
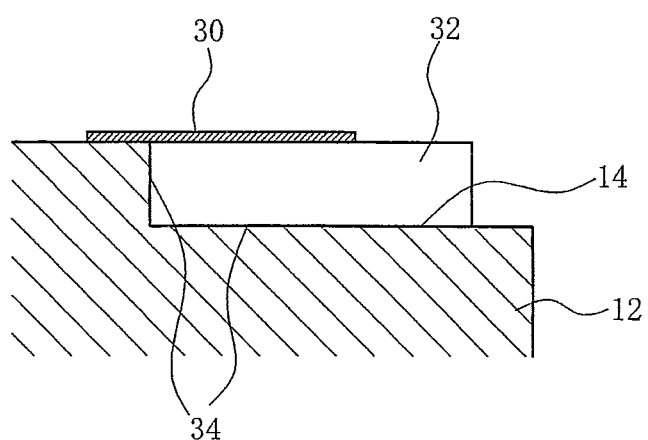
[FIG. 9]
Figure 9:
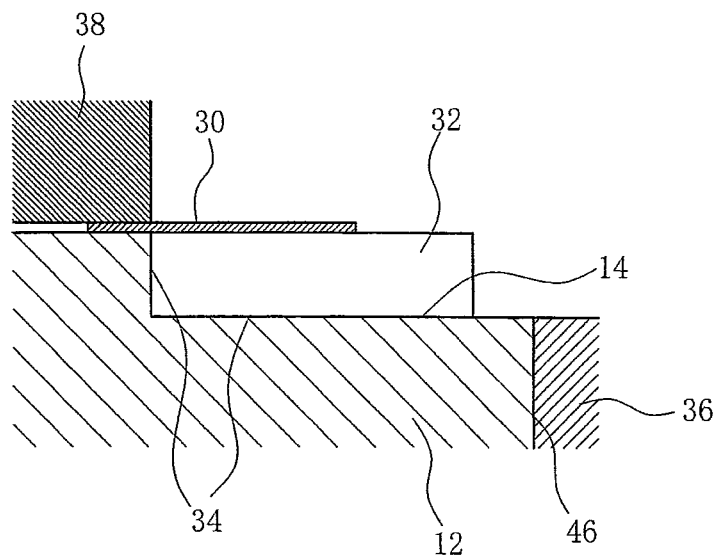

In the first place as shown in FIG. 9(a), a rubber elastic body that is a raw material 32 of a seal member is disposed in the depressed part 14 of the seal plate 12. An adhesive agent has been coated on a bonded surface 34 of the seal plate 12.

In the second place, the radical resistant body 30 is disposed on the upper surface of the raw material 32 of the seal member. An adhesive agent has been coated on the radical resistant body 30.

At this time, the radical resistant body 30 is formed in an extending manner up to the upper side of the seal plate 12. In addition, the radical resistant body 30 is not located on the entire upper surface of the raw material 32 of the seal member, and is located up to a position of the almost middle of the raw material 32.

Moreover as shown in FIG. 9(b), a metal mold 36 is disposed on the side end part 46 of the seal plate 12, and in this state, the radical resistant body 30 part that has been formed on the seal plate 12 in an extending manner is pressed by the pressing member 38, whereby a thermo compression bonding of the seal plate 12 and the radical resistant body 30 is carried out. It is preferable that a temperature of the pressing member 38 during the thermo compression bonding is determined based on a material quality of the raw material 32 of the seal member. A temperature of the pressing member 38 during the thermo compression bonding is approximately 150° C. preferably, and in the range of 150° C. to 250° C. more preferably.

A pressing strength at this time is 80 kgf/cm² preferably, and in the range of 50 to 100 kgf/cm² more preferably.

By carrying out a thermo compression bonding of the seal plate 12 and the radical resistant body 30 at this time, in the case in which the raw material 32 of the seal member is formed in the process described later, the raw material 32 of the seal member can be prevented from flowing to the inner circumferential side of the seal plate 12 and a burr can be prevented from being generated in a certain manner.

Figure 10A:
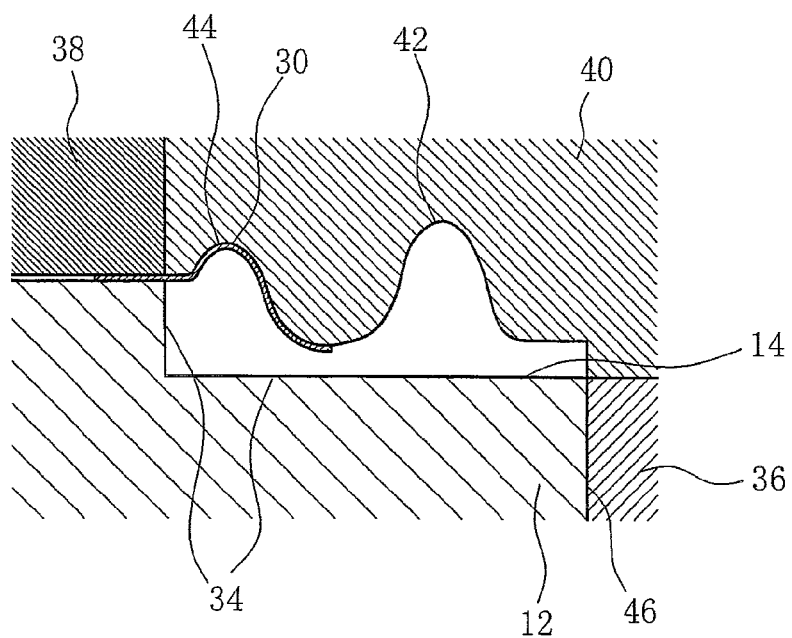
[FIG. 10]

In the next place as shown in FIG. 10(a), a metal mold 40 that is provided with a depressed part 42 configured to form a vacuum seal part and a depressed part 44 configured to form a radical seal part is disposed above the seal plate 12, the metal mold 40 is moved in a direction of the seal plate 12, and the raw material 32 of the seal member and the radical seal part 30 are formed at the same time.

Figure 10B:
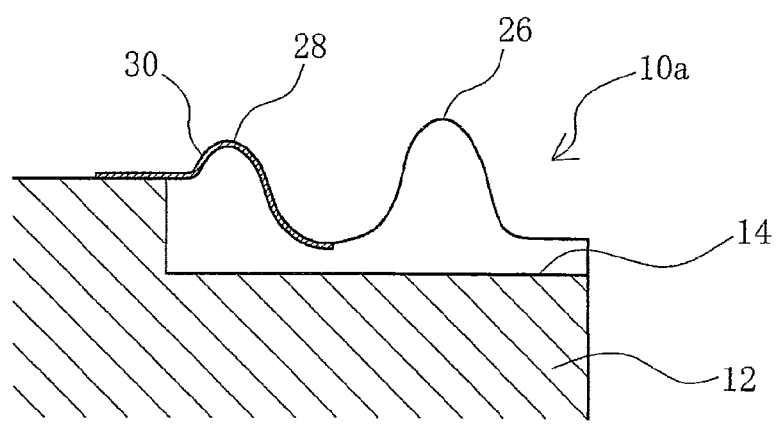
Figure 11:
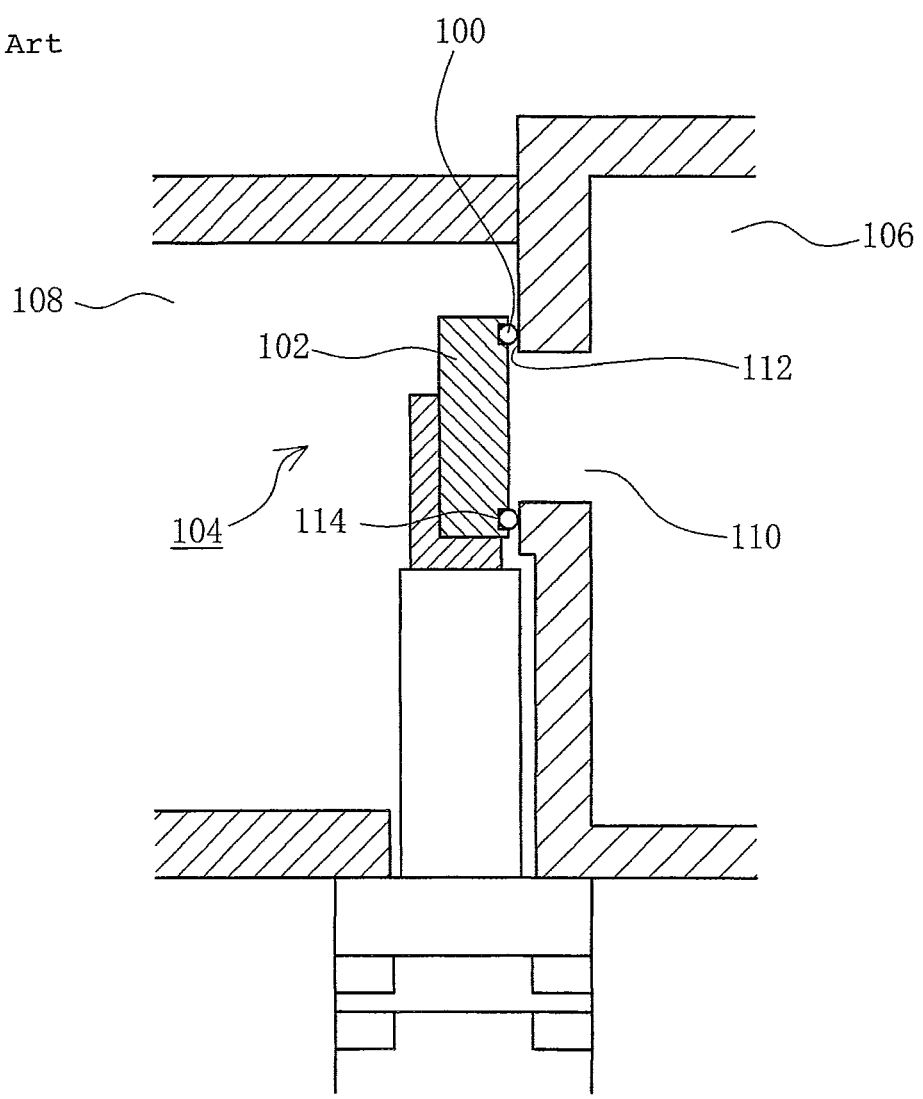
[FIG. 11]
Figure 12:
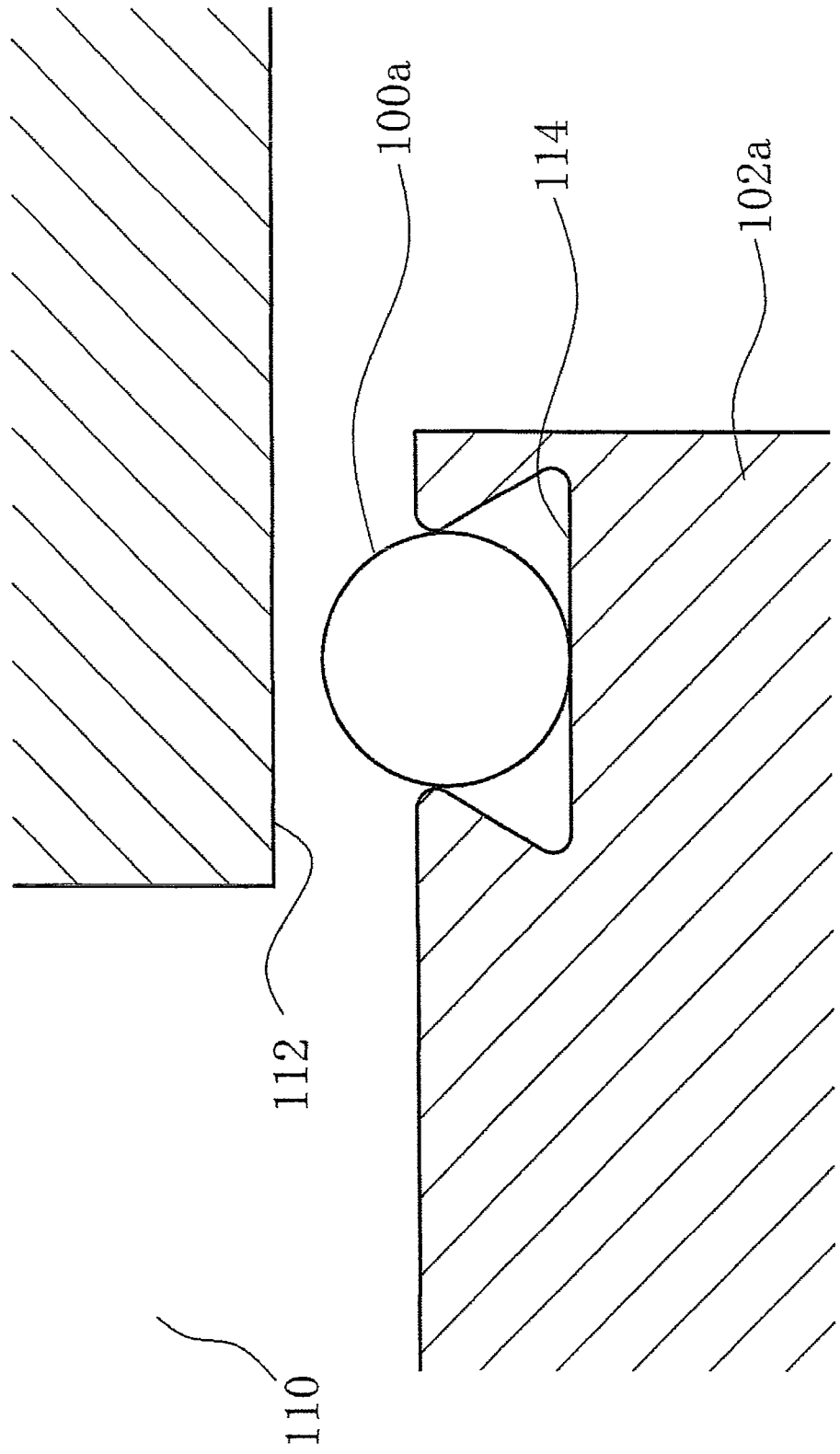
[FIG. 12]
Figure 13:
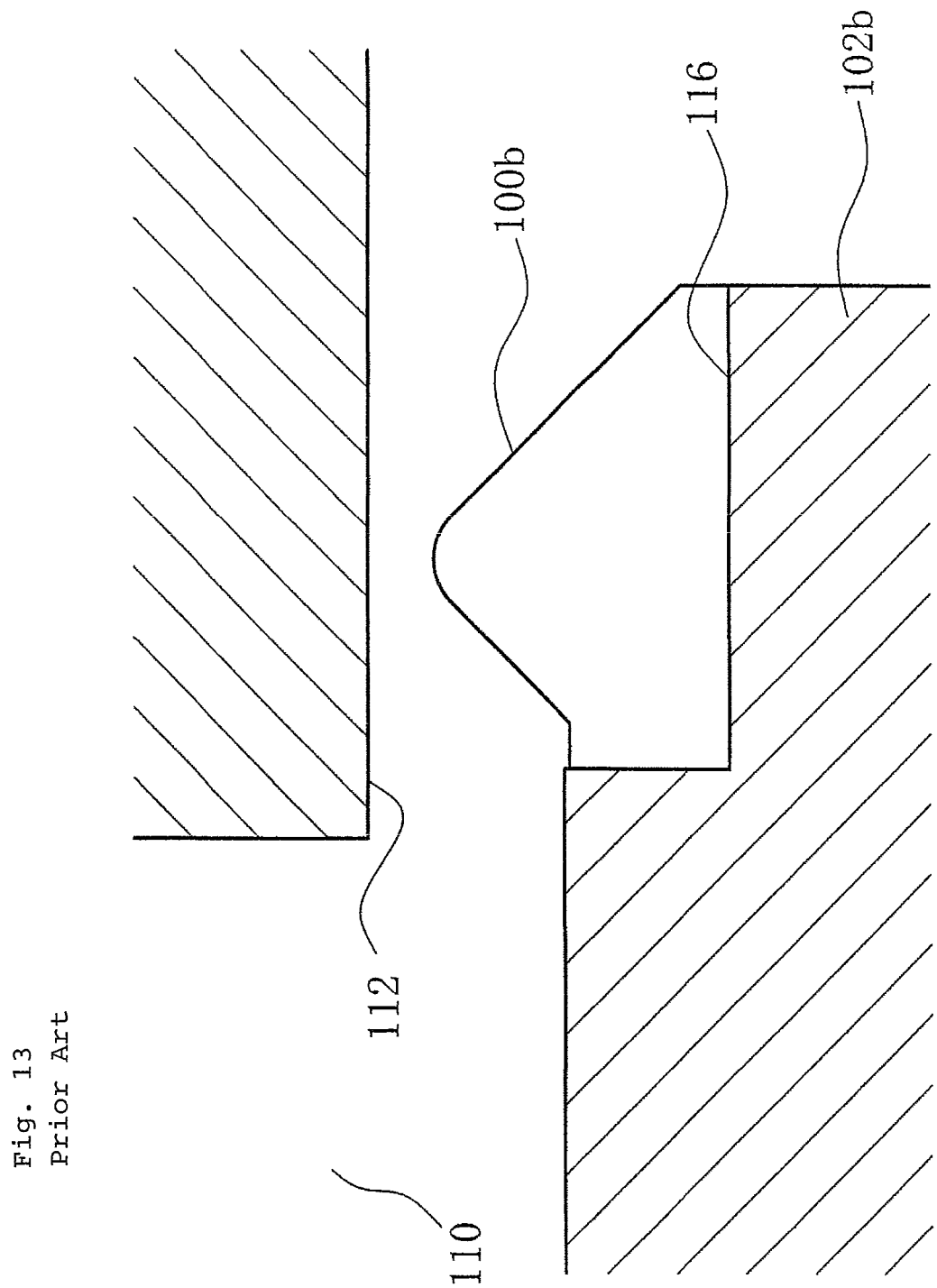
[FIG. 13]
Figure 14:
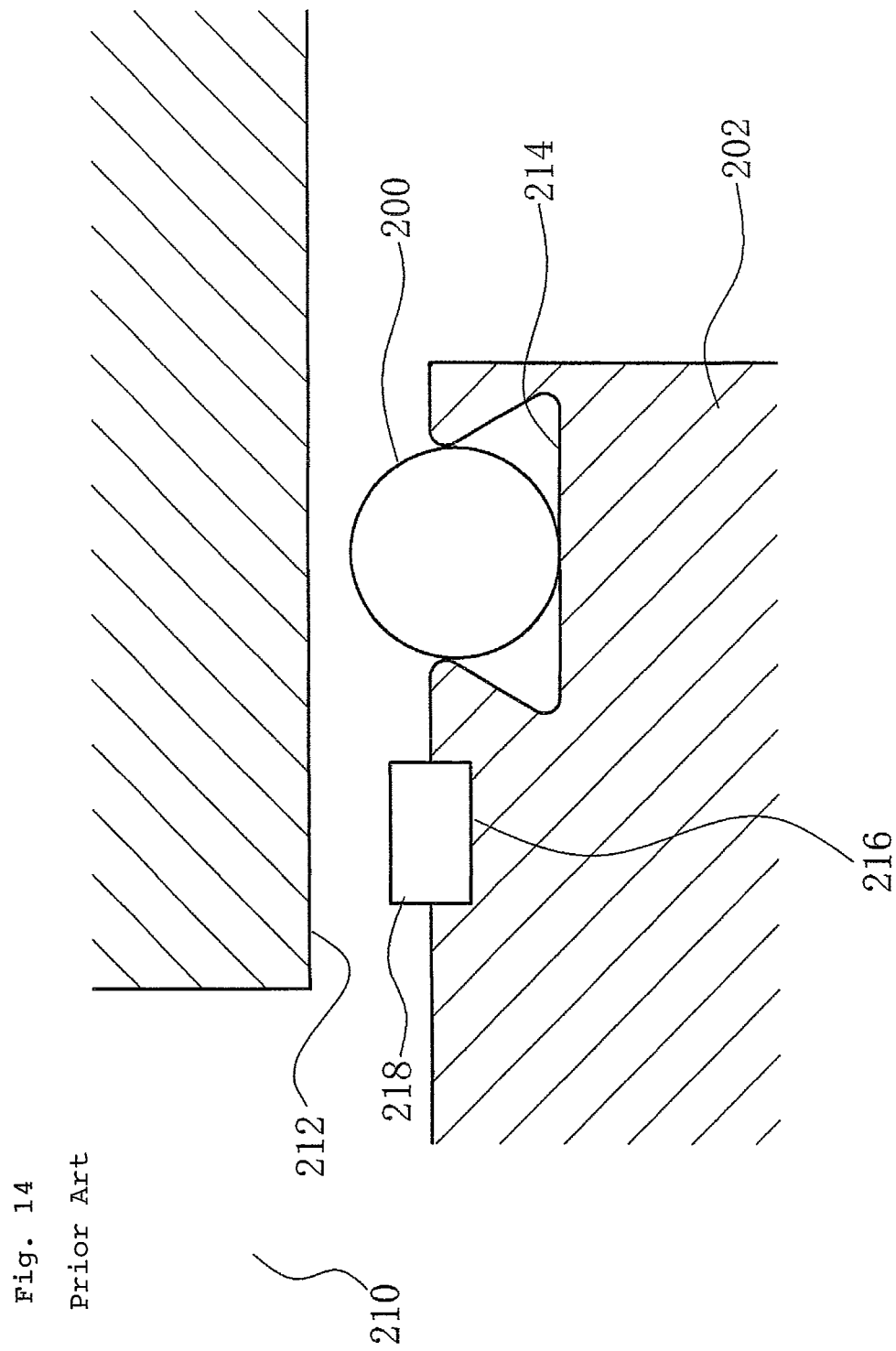
[FIG. 14]
Figure 15:
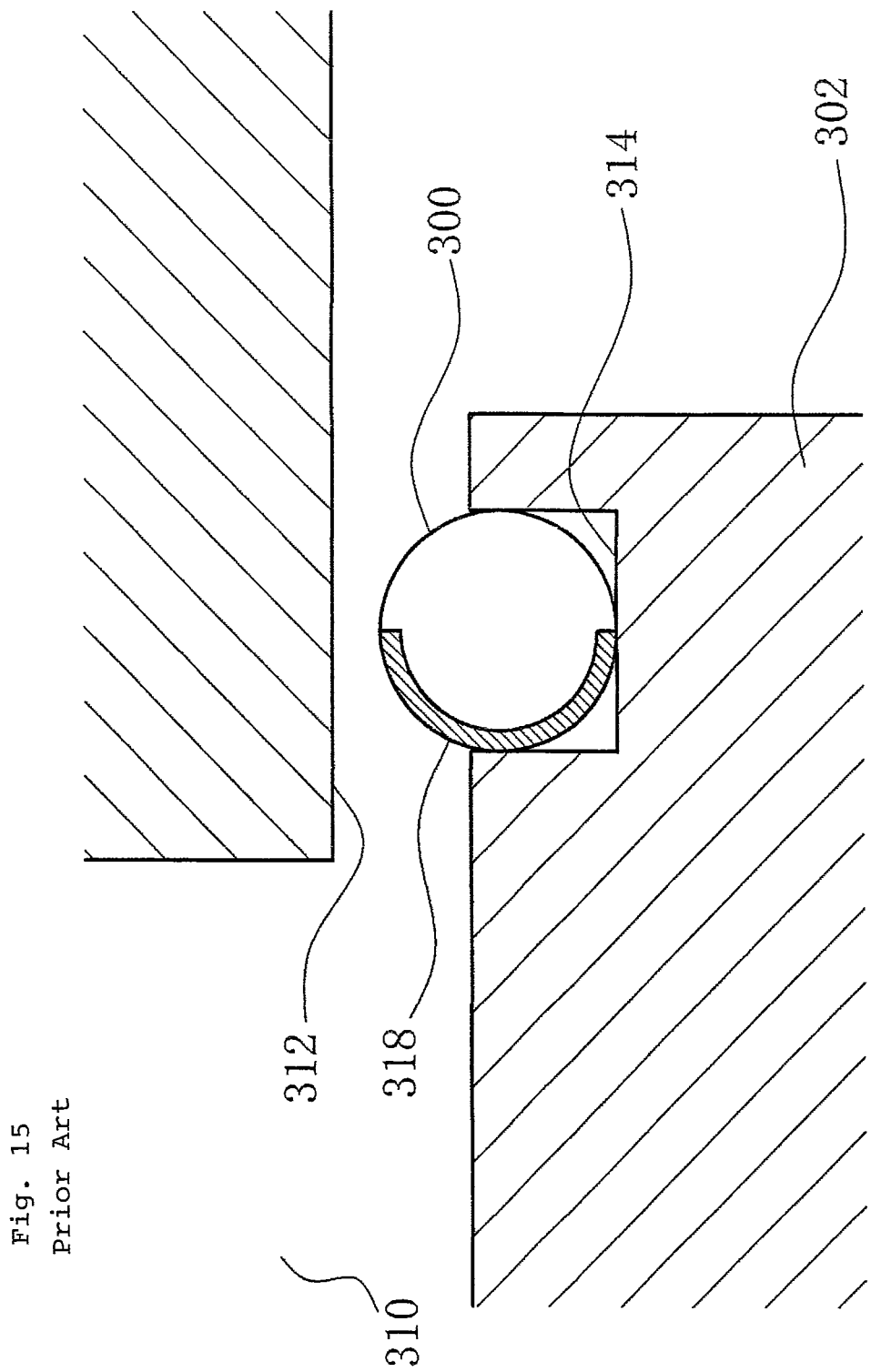
[FIG. 15]

In the last place as shown in FIG. 10(b), the metal mold 40 and the metal mold 36 are removed and the pressing member 38 is also removed to obtain the seal plate 12 in which the seal member 10a in accordance with the present invention has been bonded to the depressed part 14.

By the above method for manufacturing, the seal plate 12 in which the seal member 10a that is provided with the vacuum seal part 26 and the radical seal part 28 has been bonded to the depressed part 14 can be obtained in a certain manner.

The above described method for manufacturing is corresponded to a mode of the seal member 10a in accordance with the first embodiment.

The modes of the other seal members 10b to 10f shown in FIGS. 4 to 8 can also be manufactured by a method equivalent to that of the first embodiment in essence.

In the case in which a seal member is configured by a plurality of members like the modes shown in FIGS. 5, 6, and 7, the plurality of members can be formed separately and then can be combined later.

While the preferred embodiments in accordance with the present invention have been described above, the present invention is not restricted to the embodiments described above, the above embodiments can be combined with each other, and various changes, modifications, and functional additions can be thus made without departing from the scope of the present invention.

The invention claimed is:

1. A sealing assembly for sealing a gate opening part, the sealing assembly comprising:
    a valve seat surface;
    a seal plate provided opposite the valve seat surface, the valve seat surface and the seal plate configured for moving relative to each other to selectively define a sealing interface when the valve seat surface and the seal plate are arranged in a closed position and a gap when the valve seat surface and the seal plate are arranged in an open position;
    a depressed part formed at an outer peripheral edge of the seal plate, the depressed part being recessed relative a central portion of the seal plate and having a first end proximate to the outer peripheral edge of the seal plate and a second end proximate to the central portion of the seal plate; and
    a seal member bonded via an adhesive agent to the depressed part, the seal member comprising:
        a vacuum seal part having a rubber elastic body provided at the first end of the depressed part, the vacuum seal part configured for maintaining a seal between the valve seat surface and the seal plate in the closed position; and
        a radical seal part at the second end of the depressed part, the radical seal part configured for preventing the seal member from being affected by a treatment gas when the valve seat surface and the seal plate are in the closed position,
    wherein the radical seal part defines a radical resistant body having a portion that extends from the rubber elastic body of the vacuum seal part to the seal plate such that the portion is thermally compression bonded to the seal plate,
    wherein the radical seal part is integrally bonded to the vacuum seal part and extends from the vacuum seal part toward the valve seat surface, and wherein the at least a portion of the radical seal part is integrally bonded to the seal plate.

2. The sealing assembly recited in claim 1, wherein the vacuum seal part comes into contact with the valve seat surface before the radical seal part.

* * * * *